US010815925B2

(12) United States Patent  (10) Patent No.: US 10,815,925 B2
Uchida et al.  (45) Date of Patent: Oct. 27, 2020

(54) VEHICLE AND CONTROL METHOD FOR VEHICLE

(71) Applicants: TOYOTA JIDOSHA KABUSHIKI KAISHA, Toyota-shi, Aichi-ken (JP); AISIN AW CO., LTD., Anjo-shi, Aichi-ken (JP)

(72) Inventors: Kenji Uchida, Nagoya (JP); Tadaaki Watanabe, Anjo (JP)

(73) Assignees: TOYOTA JIDOSHA KABUSHIKI KAISHA, Toyota-shi, Aichi-ken (JP); AISIN AW CO., LTD., Anjo-shi, Aichi-ken (JP)

( * ) Notice: Subject to any disclaimer, the term of this patent is extended or adjusted under 35 U.S.C. 154(b) by 94 days.

(21) Appl. No.: 15/947,014

(22) Filed: Apr. 6, 2018

(65) Prior Publication Data

US 2018/0298841 A1  Oct. 18, 2018

(30) Foreign Application Priority Data

Apr. 12, 2017  (JP) ................................ 2017-078581

(51) Int. Cl.
  *F02D 41/22*  (2006.01)
  *F02D 11/10*  (2006.01)
  (Continued)

(52) U.S. Cl.
  CPC ............ *F02D 41/222* (2013.01); *B60K 6/445* (2013.01); *B60W 50/023* (2013.01);
  (Continued)

(58) Field of Classification Search
  CPC ............. F02D 41/222; F02D 2041/227; F02D 11/105; F02D 11/107; B60W 2540/10; B60W 2540/103
  See application file for complete search history.

(56) References Cited

U.S. PATENT DOCUMENTS 5,875,760 A * 3/1999 Bauer ..................... B60T 8/885
123/397
5,983,859 A * 11/1999 Bruedigam ........... F02D 11/107
123/396

(Continued)

FOREIGN PATENT DOCUMENTS

EP  2 792 873 A1  10/2014
JP  59-12145 A   1/1984
(Continued)

*Primary Examiner* — Sizo B Vilakazi
*Assistant Examiner* — Anthony L Bacon
(74) *Attorney, Agent, or Firm* — Sughrue Mion, PLLC

(57) ABSTRACT

A vehicle includes two accelerator position sensors and an electronic control unit. The two accelerator position sensors are configured to detect accelerator operation amounts. The electronic control unit is configured to perform drive control based on the accelerator operation amounts from the two accelerator position sensors. The electronic control unit is configured to, when failure occurs in one accelerator position sensor out of the two accelerator position sensors, perform the drive control based on the accelerator operation amount from the other accelerator position sensor out of the two accelerator position sensors, the accelerator operation amount being restricted by an accelerator operation amount upper limit that has a tendency of becoming larger as the vehicle speed is larger.

6 Claims, 3 Drawing Sheets

(51) Int. Cl.
  *B60W 50/10* (2012.01)
  *B60W 50/023* (2012.01)
  *B60K 6/445* (2007.10)
  *B60W 50/02* (2012.01)

(52) U.S. Cl.
  CPC ........... *B60W 50/10* (2013.01); *F02D 11/106* (2013.01); *F02D 11/107* (2013.01); *B60W 2050/0215* (2013.01); *B60W 2520/10* (2013.01); *B60W 2540/10* (2013.01); *B60W 2710/083* (2013.01); *F02D 2200/501* (2013.01); *F02D 2200/602* (2013.01); *F02D 2400/08* (2013.01); *Y02T 10/6239* (2013.01)

(56) References Cited

U.S. PATENT DOCUMENTS

| | | | | |
|---|---|---|---|---|
| 6,073,610 | A * | 6/2000 | Matsumoto | F02D 11/107 123/396 |
| 6,178,947 | B1 * | 1/2001 | Machida | F02D 11/106 123/396 |
| 6,273,061 | B1 * | 8/2001 | Hosoi | F02D 11/107 123/333 |
| 2001/0029414 | A1 * | 10/2001 | Nada | B60K 6/445 701/29.7 |
| 2002/0193935 | A1 * | 12/2002 | Hashimoto | F02D 41/266 701/110 |
| 2004/0002808 | A1 * | 1/2004 | Hashimoto | F02D 11/107 701/107 |
| 2006/0206252 | A1 * | 9/2006 | Katrak | F02D 11/107 701/70 |
| 2007/0027609 | A1 * | 2/2007 | Watanabe | F02D 9/02 701/114 |

FOREIGN PATENT DOCUMENTS

| | | |
|---|---|---|
| JP | 2012-117377 A | 6/2012 |
| JP | 5106694 B1 | 12/2012 |
| JP | 2013-60826 A | 4/2013 |

* cited by examiner

VEHICLE AND CONTROL METHOD FOR VEHICLE

INCORPORATION BY REFERENCE

The disclosure of Japanese Patent Application No. 2017-078581 filed on Apr. 12, 2017 including the specification, drawings and abstract is incorporated herein by reference in its entirety.

BACKGROUND

1. Technical Field

The present disclosure relates to vehicles, and more particularly relates to a vehicle having two accelerator position sensors.

2. Description of Related Art

Japanese Patent Application Publication No. 2012-117377 (JP 2012-117377 A) discloses a vehicle having two accelerator position sensors: main and sub accelerator position sensors. In JP 2012-117377 A, when failure occurs in the main accelerator position sensor, while the sub accelerator position sensor is normal, the vehicle uses a first threshold as an upper limit of an accelerator operation amount. In the vehicle disclosed in JP 2012-117377 A, when failure occurs in the main accelerator position sensor, while abnormality occurs in the sub accelerator position sensor, the vehicle uses a second threshold smaller than the first threshold as the upper limit of the accelerator operation amount. This enables the vehicle to perform adequate limp home operation corresponding to a traveling state.

SUMMARY

In the case of the above vehicle, when failure occurs in the main accelerator position sensor, the vehicle travels based on the accelerator operation amount detected by the sub accelerator position sensor. In that case, the first threshold is used as the upper limit of the accelerator operation amount. Accordingly, the vehicle fails to accelerate when vehicle speed reaches the speed at which travel resistance is balanced with driving force obtained when the accelerator operation amount is equal to the first threshold.

The present disclosure provides a vehicle capable of traveling at high vehicle speed, while securing stable traveling performance, even when failure occurs in one of two accelerator position sensors.

A first aspect of the present disclosure provides a vehicle including two accelerator position sensors and an electronic control unit. The two accelerator position sensors are configured to detect accelerator operation amounts, respectively. The electronic control unit is configured to perform drive control based on the accelerator operation amounts detected by the two accelerator position sensors. When the electronic control unit determines that failure has occurred in one accelerator position sensor out of the two accelerator position sensors, the control unit is configured to perform the drive control based on the accelerator operation amount from the other accelerator position sensor out of the two accelerator position sensors, the accelerator operation amount being restricted by an accelerator operation amount upper limit. The accelerator operation amount upper limit has a tendency of becoming larger as the vehicle speed is larger.

According to the configuration, when failure occurs in one accelerator position sensor out of the two accelerator position sensors, the drive control is performed based on the accelerator operation amount obtained from the other accelerator position sensor out of the two accelerator position sensors, the accelerator operation amount being restricted by an accelerator operation amount upper limit that has a tendency of becoming larger as the vehicle speed is larger. Since the accelerator operation amount is restricted by the accelerator operation amount upper limit, stable traveling performance can be secured. Since the accelerator operation amount upper limit has a tendency of becoming larger as the vehicle speed is larger, the vehicle can travel at high vehicle speed. As a result, the vehicle can travel at high vehicle speed, while securing stable traveling performance, even when failure occurs in one of the two accelerator position sensors.

In the vehicle, the accelerator operation amount upper limit may be a constant value, when the vehicle speed is at least equal to or above a first specified vehicle speed and less than a second specified vehicle speed. Accordingly, traveling stability in occasions such as turning at relatively low vehicle speed can be secured with more reliability.

The vehicle may further include a vehicle speed sensor configured to detect the vehicle speed. When the electronic control unit determines that failure has occurred in the vehicle speed sensor, the electronic control unit may be configured to set the accelerator operation amount upper limit to zero in a region equal to or above a predetermined maximum vehicle speed. This makes it possible to cope with the situation where the vehicle speed is erroneously determined to be high vehicle speed due to failure in the vehicle speed sensor.

In the vehicle, the accelerator operation amount upper limit may be equal to or below an accelerator operation amount corresponding to a safe acceleration limit. The safe acceleration limit is an acceleration threshold value predetermined as an upper limit of acceleration that allows safe acceleration. This enables the vehicle to travel in the range of safe acceleration. Here, the acceleration that allows safe acceleration signifies the acceleration within the range where a driver can safely cope with an unintended accelerator operation amount generated due to occurrence of abnormality in the accelerator position sensor which is not determined to be failed.

A second aspect of the present disclosure relates to a control method for a vehicle. The vehicle includes two accelerator position sensors and an electronic control unit. The two accelerator position sensors are configured to detect accelerator operation amounts. The control method includes: performing, by the electronic control unit, drive control based on the accelerator operation amounts detected by the two accelerator position sensors; and when the electronic control unit determines that failure has occurred in one accelerator position sensor out of the two accelerator position sensors, performing, by the electronic control unit, the drive control based on the accelerator operation amount from the other accelerator position sensor out of the two accelerator position sensors, the accelerator operation amount being restricted by an accelerator operation amount upper limit. The accelerator operation amount upper limit has a tendency of becoming larger as the vehicle speed is larger.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Now, modes for carrying out the present disclosure will be described in detail based on an embodiment.

Figure 1:
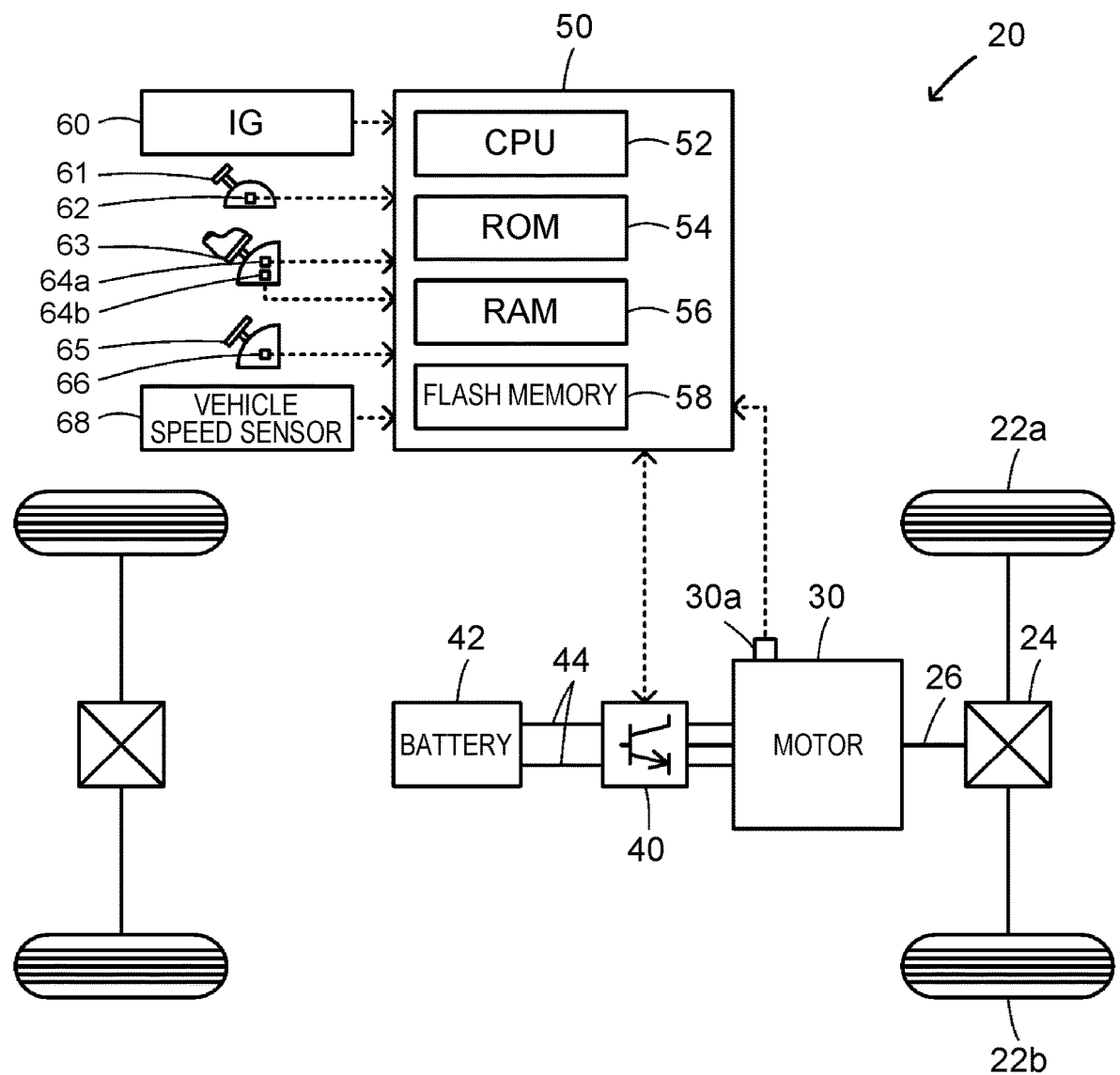
FIG. 1 is a block diagram illustrating an outlined configuration of an electric vehicle as one embodiment of the present disclosure.

FIG. 1 is a block diagram illustrating an outlined configuration of an electric vehicle 20 as one embodiment of the present disclosure. As illustrated in FIG. 1, the electric vehicle 20 of the embodiment includes a motor 30, an inverter 40, a battery 42, and an electronic control unit 50.

For example, the motor 30 is configured as a synchronous generator-motor. The motor 30 is connected to a driving shaft 26 coupled to driving wheels 22a, 22b through a differential gear 24. The inverter 40 is connected with the motor 30 and is also connected with the battery 42 through an electric power line 44. The motor 30 is rotationally driven when the electronic control unit 50 controls switching of a plurality of switching elements of the inverter 40, which are not illustrated. For example, the battery 42 is configured as a lithium-ion secondary battery or a nickel-hydrogen secondary battery. As described before, the battery 42 is connected with the inverter 40 through the electric power line 44.

The electronic control unit 50 is configured as a microprocessor having a CPU 52 as a main component. The electronic control unit 50 includes, in addition to the CPU 52, a ROM 54 that stores processing programs, a RAM 56 that temporarily stores data, a flash memory 58 as a nonvolatile memory that stores and retains data, input and output ports, and a communication port. The electronic control unit 50 receives signals from various sensors through the input port. Examples of the signals input in the electronic control unit 50 may include rotational position θm of the motor 30 from a rotational position detection sensor 30a that detects the rotational position of a rotor of the motor 30, and phase currents Iu, Iv, Iw from current sensors that detects electric current flowing in respective phases of the motor 30. The examples of the signals may also include voltage Vb of the battery 42 from a voltage sensor provided across the terminals of the battery 42, and electric current Ib of the battery 42 from a current sensor attached to the output terminal of the battery 42. The examples of the signals may further include an ignition signal from an ignition switch 60, and a shift position SP from a shift position sensor 62 that detects an operative position of a shift lever 61. In addition, the examples of the signals may include accelerator operation amounts Acc(1), Acc(2) from a main accelerator pedal position sensor 64a and a sub accelerator pedal position sensor 64b that detect the stepping-in amount of the accelerator pedal 63, brake pedal position BP from a brake pedal position sensor 66 that detects the stepping-in amount of the brake pedal 65, and vehicle speed V from a vehicle speed sensor 68. The electronic control unit 50 outputs various control signals through the output port. Examples of the signals output from the electronic control unit 50 may include switching control signals to the plurality of switching elements of the inverter 40, which are not illustrated. The electronic control unit 50 calculates an angular speed ωm and a rotation speed Nm based on the rotational position θm of the rotor of the motor 30 from the rotational position detection sensor 30a, and calculates a state of charge SOC of the battery 42 based on an integrated value of the electric current Ib of the battery 42 from the current sensor. The state of charge SOC of the battery 42 refers to a ratio of capacity of electric power dischargeable from the battery 42 to the total capacity of the battery 42.

The thus-configured electric vehicle 20 of the embodiment travels when the electronic control unit 50 executes drive control based on the operation of the driver. The drive control is performed by: setting a request torque Tp* requested to the driving shaft 26 based on the accelerator operation amount Acc and the vehicle speed V; setting a torque command Tm* of the motor 30 by restricting the set request torque Tp* by a maximum permissible output Tlim of the motor 30 (by using a maximum permissible output Tlim as an upper limit); and performing switching control of the plurality of switching elements of the inverter 40 such that the motor 30 is driven with the torque command Tm*.

Figure 2:
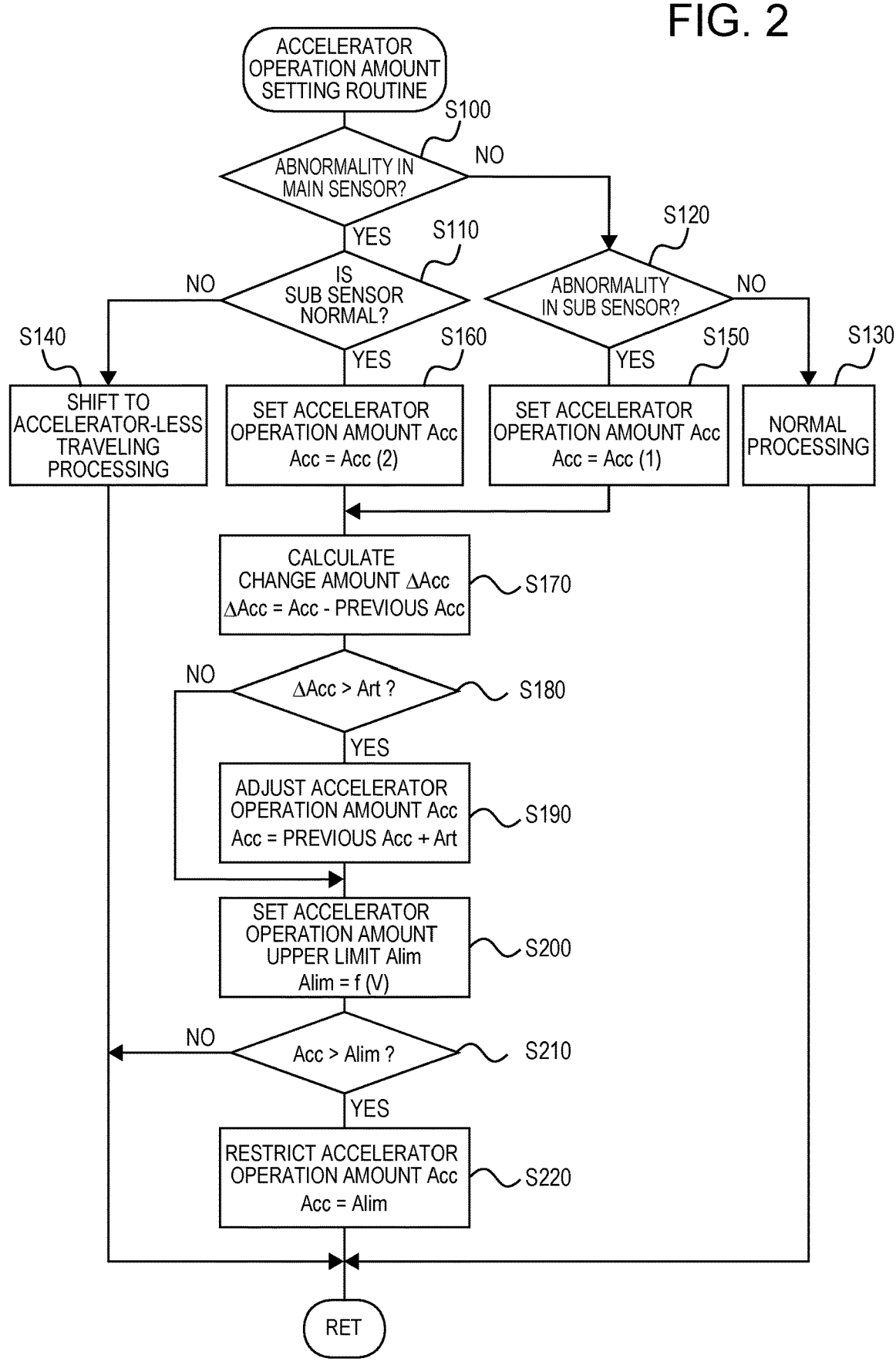
FIG. 2 is a flowchart illustrating one example of an accelerator operation amount setting routine executed by an electronic control unit.

In the electric vehicle 20 of the embodiment, the accelerator operation amount Acc is set by an accelerator operation amount setting routine illustrated in FIG. 2. The routine is executed by the electronic control unit 50 in every specified time (for example, every several msec and several dozen msec).

When the accelerator operation amount setting routine is executed, the electronic control unit 50 first determines whether or not abnormality (failure) has occurred in the main accelerator pedal position sensor 64a or the sub accelerator pedal position sensor 64b (steps S100 to S130). Whether or not abnormality has occurred in the main accelerator position sensor 64a or the sub accelerator pedal position sensor 64b can be determined by reading the value of an abnormality determination flag as a result of well-known abnormality diagnosis (failure diagnosis).

When the electronic control unit 50 determines that abnormality (failure) has occurred neither in the main accelerator pedal position sensor 64a nor in the sub accelerator pedal position sensor 64b in steps S100, S120, the electronic control unit 50 sets the accelerator operation amount Acc by general processing (step S130), and ends the present routine. Examples of the general processing may include processing of setting, as the accelerator operation amount Acc, a mean value of the accelerator operation amount Acc(1) from the main accelerator pedal position sensor 64a and the accelerator operation amount Acc(2) from the sub accelerator pedal position sensor 64b, and processing of setting, as the accelerator operation amount Acc, the accelerator operation amount Acc(1) from the main accelerator pedal position sensor 64a.

When the electronic control unit 50 determines that abnormality (failure) has occurred both in the main accelerator pedal position sensor 64a and the sub accelerator pedal position sensor 64b in steps S100 and S110, the processing shifts to accelerator-less traveling processing (step S140), and the present routine is ended. Examples of the accelerator-less traveling processing may include processing of traveling at a specified vehicle speed (for example, a vehicle speed of several km/h).

When the electronic control unit 50 determines that no abnormality (failure) has occurred in the main accelerator pedal position sensor 64a but abnormality (failure) has occurred in the sub accelerator pedal position sensor 64b in steps S100 to S120, the electronic control unit 50 sets the accelerator operation amount Acc(1) from the main accelerator pedal position sensor 64a as the accelerator operation amount Acc (step S150). On the contrary, when the electronic control unit 50 determines that that abnormality (failure) has occurred in the main accelerator pedal position sensor 64a but no abnormality (failure) has occurred in the sub accelerator pedal position sensor 64b, the electronic control unit 50 sets the accelerator operation amount Acc(2) from the sub accelerator pedal position sensor 64b as the accelerator operation amount Acc (step S160).

Next, the electronic control unit 50 calculates a change amount ΔAcc of the accelerator operation amount by subtracting from the set accelerator operation amount Acc an accelerator operation amount Acc set when the routine was previously executed (hereinafter referred to as a previous accelerator operation amount Acc) (step S170), and determines whether or not the change amount ΔAcc of the accelerator operation amount is larger than a rate value Art (step S180). The rate value Art is preset as an upper limit used when the accelerator operation amount Acc is increased at time intervals of repeated execution of the routine. When the change amount ΔAcc of the accelerator operation amount is larger than the rate value Art, the electronic control unit 50 performs adjustment such that a value obtained by adding the rate value Art to the previous accelerator operation amount Acc is used as the accelerator operation amount Acc (step S190). When the change amount ΔAcc of the accelerator operation amount is equal to or below the rate value Art, the electronic control unit 50 does not perform such adjustment of the accelerator operation amount Acc.

Figure 3:
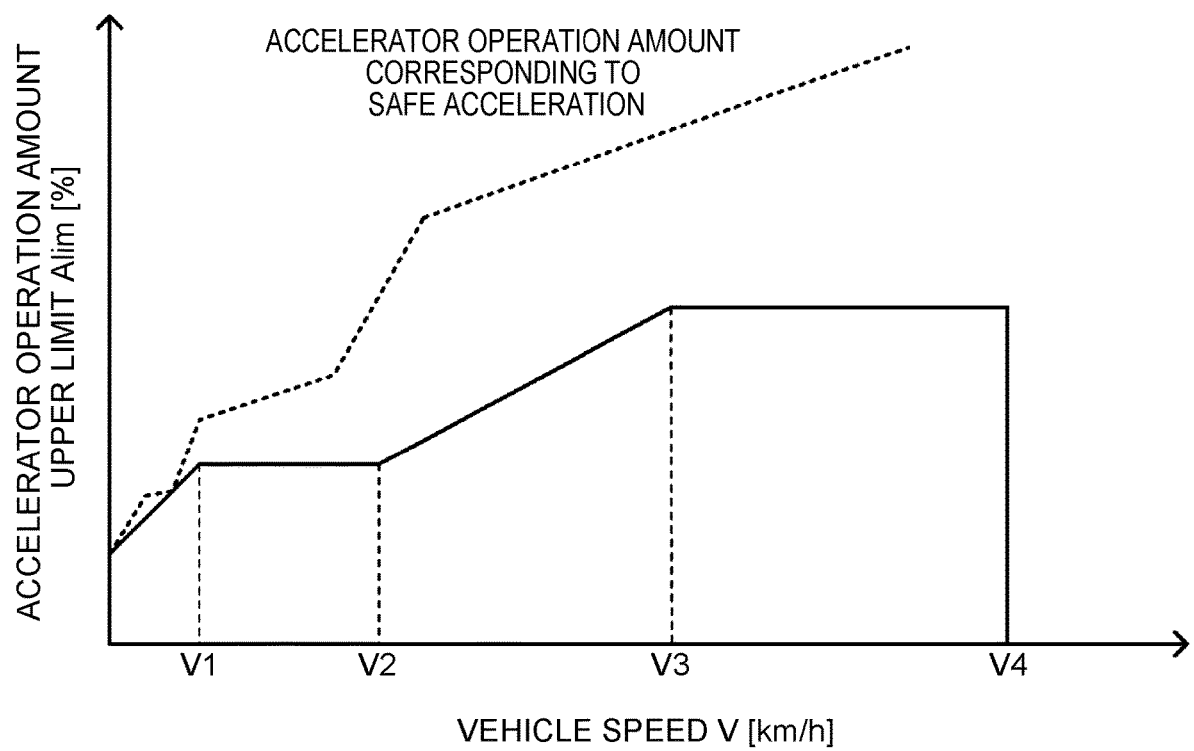
FIG. 3 is an explanatory view illustrating one example of a map for setting an accelerator operation amount upper limit.

Then, the electronic control unit 50 sets an accelerator operation amount upper limit Alim as an upper limit value of the accelerator operation amount Acc based on the vehicle speed V (step S200), restricts the accelerator operation amount Acc by the set accelerator operation amount upper limit Alim (steps S210, S220), and ends the present routine. Specifically, the accelerator operation amount Acc is restricted by setting the accelerator operation amount Acc as the accelerator operation amount upper limit Alim, when the accelerator operation amount Acc is larger than the accelerator operation amount upper limit Alim. In the embodiment, relation between the vehicle speed V and the accelerator operation amount upper limit Alim is set in advance and is stored in the ROM 54 as a map for setting the upper limit of the accelerator operation amount. When a vehicle speed V is given, an accelerator operation amount upper limit Alim corresponding to the given vehicle speed V is derived from the map and is set. FIG. 3 illustrates one example of the map for setting the upper limit of the accelerator operation amount. In FIG. 3, a solid line represents the accelerator operation amount upper limit Alim, and a dashed line represents an accelerator operation amount corresponding to safe acceleration. The safe acceleration signifies acceleration within the range where the driver can safely cope with an unintended accelerator operation amount generated due to occurrence of abnormality in the accelerator position sensor which is not determined to be failed. Further, an acceleration threshold value predetermined as an upper limit of acceleration that allows safe acceleration is defined as a safe acceleration limit. The accelerator operation amount corresponding to safe acceleration is the accelerator operation amount Acc that provides safe acceleration.

As illustrated in FIG. 3, in the embodiment, the accelerator operation amount upper limit Alim is set to be equal to or below the accelerator operation amount corresponding to safe acceleration. The accelerator operation amount upper limit Alim is also set to be larger as the vehicle speed V is larger. To be more specific, the accelerator operation amount upper limit Alim is basically set to be constant in the range of vehicle speed V2 or less (for example, 30 km/h, 40 km/h, 50 km/h) in consideration of stable traveling performance at the time of turning and the like. When the accelerator operation amount corresponding to safe acceleration is below the accelerator operation amount upper limit Alim, priority is given to the accelerator operation amount corresponding to safe acceleration, and the accelerator operation amount upper limit Alim is set to a value equal to or below the accelerator operation amount corresponding to safe acceleration. In FIG. 3, when the vehicle speed is equal to or below vehicle speed V1 (for example, 10 km/h etc.), the accelerator operation amount corresponding to safe acceleration is below a constant value in a low vehicle speed region. In the range of the vehicle speed V1 or below, the accelerator operation amount upper limit Alim is made linear in order to reduce map points. Thus, the accelerator operation amount upper limit Alim is set to be a constant value at relatively low vehicle speeds, so that the stable traveling performance can be secured even in turning and the like. The accelerator operation amount upper limit Alim is set to linearly increase with respect to the vehicle speed V in the range of the vehicle speed V2 to the vehicle speeds V3 (for example, 130 km/h, 140 km/h, 150 km/h, etc.). The accelerator operation amount upper limit Alim is set to be a constant value from the vehicle speed V3 to the vehicle speed V4 (maximum vehicle speed). The maximum vehicle speed is a vehicle speed predetermined for the vehicle. Since the accelerator operation amount upper limit Alim is set to be larger as the vehicle speed V becomes larger, the vehicle can travel at relatively high vehicle speeds even when abnormality occurs in one of the two accelerator pedal position sensors 64a, 64b. Furthermore, the accelerator operation amount upper limit Alim is set to a value zero when the vehicle speed is equal to or above the maximum vehicle speed (vehicle speed V4). This makes it possible to cope with the situation where the vehicle speed V is erroneously determined to be a high vehicle speed due to occurrence of abnormality (failure) in the vehicle speed sensor 68.

In the electric vehicle 20 of the embodiment described in the foregoing, when abnormality occurs in the one of the two accelerator pedal position sensors 64a, 64b, a detection value from the accelerator pedal position sensor without abnormality is set as the accelerator operation amount Acc. The accelerator operation amount upper limit Alim is set to be larger as the vehicle speed V is larger, and the accelerator operation amount Acc is restricted by the set accelerator operation amount upper limit Alim. Accordingly, the vehicle can travel at high vehicle speeds, while securing stable traveling performance. In addition, the accelerator operation amount upper limit Alim is set to be a constant value at relatively low vehicle speeds, so that the stable traveling performance can be secured with more reliability even in turning and the like. Since the accelerator operation amount upper limit Alim is set to be equal to or below the accelerator operation amount corresponding to safe acceleration, the stable traveling performance can be secured with more reliability. Furthermore, since the accelerator operation amount upper limit Alim is set to be a value zero when the vehicle speed is equal to or above the maximum vehicle speed (vehicle speed V4), it is possible to cope with the situation where the vehicle speed V is erroneously determined to be a high vehicle speed due to occurrence of abnormality (failure) in the vehicle speed sensor 68.

In the electric vehicle 20 of the embodiment, when abnormality occurs in one of the two accelerator pedal position sensors 64a, 64b, the accelerator operation amount upper limit Alim is set to a constant value at relatively low vehicle speeds in the range of the vehicle speed V1 to the vehicle speed V2. However, the accelerator operation amount upper limit Alim may be set to a value that becomes larger as the vehicle speed V is larger even at relatively low vehicle speeds in the range of the vehicle speed V1 to the vehicle speed V2.

In the embodiment, the present disclosure is applied to the electric vehicle 20 having one driving motor 30. However, the present disclosure may be applied to electric vehicles having two or more driving motors, or may be applied to hybrid vehicles mounted with an engine in addition to the driving motor, or may be applied to vehicles mounted with the driving engine but not mounted with the driving motor. That is, the present disclosure may be applied to vehicles of any configuration as long as the vehicles are mounted with two accelerator position sensors that detect accelerator operation amounts and a control device that performs drive control based on the accelerator operation amounts from the two accelerator position sensors.

Correspondence relation between the main elements of the embodiment and the main elements of the present disclosure described in Summary is merely an example for specific description of the mode for carrying out the disclosure disclosed in Summary. Accordingly, the correspondence relation is not intended to limit the elements of the disclosure disclosed in Summary. More specifically, the disclosure disclosed in Summary should be interpreted based on the description therein, and the embodiment is merely a specific example of the disclosure disclosed in Summary.

Although a mode for carrying out the present disclosure has been described using the embodiment, the present disclosure is not limited in any manner to the embodiment disclosed. It should naturally be understood that the present disclosure can be carried out in various modes without departing from the scope of the present disclosure.

The present disclosure is applicable in fields such as vehicle manufacturing.

What is claimed is:

1. A vehicle, comprising:
   two accelerator position sensors configured to detect accelerator operation amounts, respectively; and
   an electronic control unit configured to perform drive control based on the accelerator operation amounts detected by the two accelerator position sensors,
   when the electronic control unit determines that failure has occurred in one accelerator position sensor out of the two accelerator position sensors, the electronic control unit is configured to perform the drive control based on the accelerator operation amount from the other accelerator position sensor out of the two accelerator position sensors, the accelerator operation amount being restricted by an accelerator operation amount upper limit, the accelerator operation amount upper limit having a tendency of becoming larger as a vehicle speed is larger,
   wherein the accelerator operation amount is adjusted based on a comparison between a rate value acceleration and a difference between a set accelerator operation amount and an accelerator operation amount determined in a previous execution of the drive control, and
   wherein the rate value acceleration is the accelerator operation amount upper limit used when the accelerator operation amount is increased at time intervals of repeated execution of the drive control.

2. The vehicle according to claim 1, wherein the accelerator operation amount upper limit is a constant value, when the vehicle speed is at least equal to or above a first specified vehicle speed and less than a second specified vehicle speed.

3. The vehicle according to claim 1, further comprising a vehicle speed sensor configured to detect the vehicle speed, wherein
   when the electronic control unit determines that failure has occurred in the vehicle speed sensor, the electronic control unit is configured to set the accelerator operation amount upper limit to zero in a region equal to or above a predetermined maximum vehicle speed.

4. The vehicle according to claim 1, wherein
   the accelerator operation amount upper limit is equal to or below an accelerator operation amount corresponding to a safe acceleration limit, and
   the safe acceleration limit is an acceleration threshold value predetermined as an upper limit of acceleration that allows safe acceleration.

5. A control method for a vehicle, the vehicle including two accelerator position sensors and an electronic control unit, the two accelerator position sensors being configured to detect accelerator operation amounts, the control method comprising:
   performing, by the electronic control unit, drive control based on the accelerator operation amounts detected by the two accelerator position sensors; and
   when the electronic control unit determines that failure has occurred in one accelerator position sensor out of the two accelerator position sensors, performing, by the electronic control unit, the drive control based on the accelerator operation amount from the other accelerator position sensor out of the two accelerator position sensors, the accelerator operation amount being restricted by an accelerator operation amount upper limit, the accelerator operation amount upper limit having a tendency of becoming larger as a vehicle speed is larger,
   wherein the accelerator operation amount is adjusted based on a comparison between a rate value acceleration and a difference between a set accelerator operation amount and an accelerator operation amount determined in a previous execution of the drive control, and
   wherein the rate value acceleration is the accelerator operation amount upper limit used when the accelerator operation amount is increased at time intervals of repeated execution of the drive control.

6. A vehicle, comprising:
   two accelerator position sensors configured to detect accelerator operation amounts, respectively; and
   an electronic control unit configured to perform drive control based on the accelerator operation amounts detected by the two accelerator position sensors,
   when the electronic control unit determines that failure has occurred in one accelerator position sensor out of the two accelerator position sensors, the electronic control unit is configured to perform the drive control based on the accelerator operation amount from the other accelerator position sensor out of the two accelerator position sensors, the accelerator operation amount being restricted by an accelerator operation amount upper limit, the accelerator operation amount upper limit having a tendency of becoming larger as a vehicle speed is larger, further comprising:
a vehicle speed sensor configured to detect the vehicle speed, wherein
when the electronic control unit determines that failure has occurred in the vehicle speed sensor, the electronic control unit is configured to set the accelerator operation amount upper limit to zero in a region equal to or above a predetermined maximum vehicle speed.

* * * * *